United States Patent
Dharwada et al.

(10) Patent No.: US 9,154,001 B2
(45) Date of Patent: Oct. 6, 2015

(54) INTUITIVE SCHEDULING FOR ENERGY MANAGEMENT DEVICES

(75) Inventors: Pallavi Dharwada, Minneapolis, MN (US); Paul Derby, Lubbock, TX (US); Wendy Foslien Graber, Woodbury, MN (US); Hari Thiruvengada, Plymouth, MN (US); Anand Tharanathan, Plymouth, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 372 days.

(21) Appl. No.: 13/111,394

(22) Filed: May 19, 2011

(65) Prior Publication Data

US 2012/0296488 A1    Nov. 22, 2012

(51) Int. Cl.
*H02J 13/00* (2006.01)
*H02J 3/14* (2006.01)

(52) U.S. Cl.
CPC ........... *H02J 13/0075* (2013.01); *H02J 13/001* (2013.01); *H02J 2003/143* (2013.01); *Y02B 70/3216* (2013.01); *Y02B 70/3266* (2013.01); *Y02B 90/2653* (2013.01); *Y04S 20/221* (2013.01); *Y04S 20/242* (2013.01); *Y04S 40/126* (2013.01)

(58) Field of Classification Search
USPC ............ 345/104, 173; 700/83, 275, 276, 291, 700/296, 299, 300
See application file for complete search history.

(56) References Cited

U.S. PATENT DOCUMENTS

| | | | |
|---|---|---|---|
| 6,786,421 B2* | 9/2004 | Rosen | 236/94 |
| 6,824,069 B2 | 11/2004 | Rosen | |
| 7,047,092 B2* | 5/2006 | Wimsatt | 700/83 |
| 7,302,642 B2 | 11/2007 | Smith et al. | |
| 7,636,604 B2 | 12/2009 | Bergman et al. | |
| 2008/0165151 A1* | 7/2008 | Lemay et al. | 345/173 |
| 2010/0064001 A1* | 3/2010 | Daily | 709/203 |
| 2011/0078622 A1 | 3/2011 | Missig et al. | |

OTHER PUBLICATIONS

"Operating Guide: for the Warmup 3iE Programmable Thermostat", 3iE Operating Guide—08/10 v1, WarmUp PLC, http://www.warmup.co.uk/pdf/uk-3ie-thermostat-operating-instructions-v6c-010910.pdf, (2010), 8 pgs.

(Continued)

*Primary Examiner* — Carlos Ortiz Rodriguez
(74) *Attorney, Agent, or Firm* — Schwegman Kundberg & Woessner, P.A.

(57) ABSTRACT

An energy management device providing a series of user interface enhancements that enable the creation and modification of energy management schedules. The energy management device may provide these user interface enhancements in connection with a touch screen interface, as the user interface receives and processes a variety of touch screen gestures from users intended to create and manipulate the energy management schedules. The user interface enhancements may include calendar views with customizable periods of interest, calendar views with overlays of scheduling and pricing information, and clocks providing runtime indications of specific energy consuming systems.

21 Claims, 6 Drawing Sheets

(56) References Cited

OTHER PUBLICATIONS

"Smart Thermostat User's Manual", Ecobee, Inc., http://www.ecobee.com/wp-content/themes/ecobee/etc/UMR5-141010WEB.pdf, (2010), 20 pgs.

Freudenthal, A., et al., "The evaluation of an innovative intelligent thermostat interface: universal usability and age differences", Cognition, Technology and Work, 5, (2003), 55-66.

Mason, D., et al., "Smartstat Detailed Specifcations", CS 170/270 Software Engineering, http://smartstat.sourceforge.net/documentation/detailed_specs.pdf, (Mar. 9, 2010), 22 pgs.

Meier, A., et al., "Thermostat Interface and Usability: A Survey", Prepared for the Ernest Orlando Lawrence Berkeley National Laboratory, http://www.osti.gov/bridge/servlets/purl/1004198-Ff7EhC/1004198.pdf, (Sep. 2010), 73 pgs.

\* cited by examiner

INTUITIVE SCHEDULING FOR ENERGY MANAGEMENT DEVICES

BACKGROUND

Energy conservation is an important aspect of energy policies. Consumers from various sectors such as commercial, residential, and the like are looking for strategies to effectively manage their energy consumption to be compliant with regulations, or be socially responsible and achieve greater economic benefits. Programmable thermostats are one example of an energy management device that has been prevalent in the industry for a long time to help consumers optimize and minimize energy usage.

Applications operating on energy management devices generally allow the users to monitor and maintain their energy consumption at desired levels. Mobile devices such as smart phones and small-screen displays such as those in liquid crystal display thermostats, however, present real-estate constraints that may impact the ease-of-use of the device to accomplish certain complex tasks. Particularly, implementing a detailed programming schedule with existing interfaces of energy management devices is a complex task.

SUMMARY

In one embodiment, an energy management device comprises a touch screen display, and a processor executing programming logic for interfacing with the touch screen display and receiving user gestures with the touch screen display, with the programming logic configured to provide a user interface and process user interface commands received with the touch screen display. The programming logic may be further configured to establish a programming schedule for control of energy consuming systems, display a visualization of the programming schedule on the touch screen, and enable user selection and changes to periods of interest within the programming schedule.

Another embodiment provides a user interface method for defining and editing schedules on a touch screen display of an energy management device. This includes techniques for establishing programming schedules for energy consuming systems, displaying a visualization of the programming schedules within the user interface, receiving and processing user touch gestures to periods of interest within the programming schedules, and displaying an updated visualization of the programming schedules.

DETAILED DESCRIPTION

Figure 1:
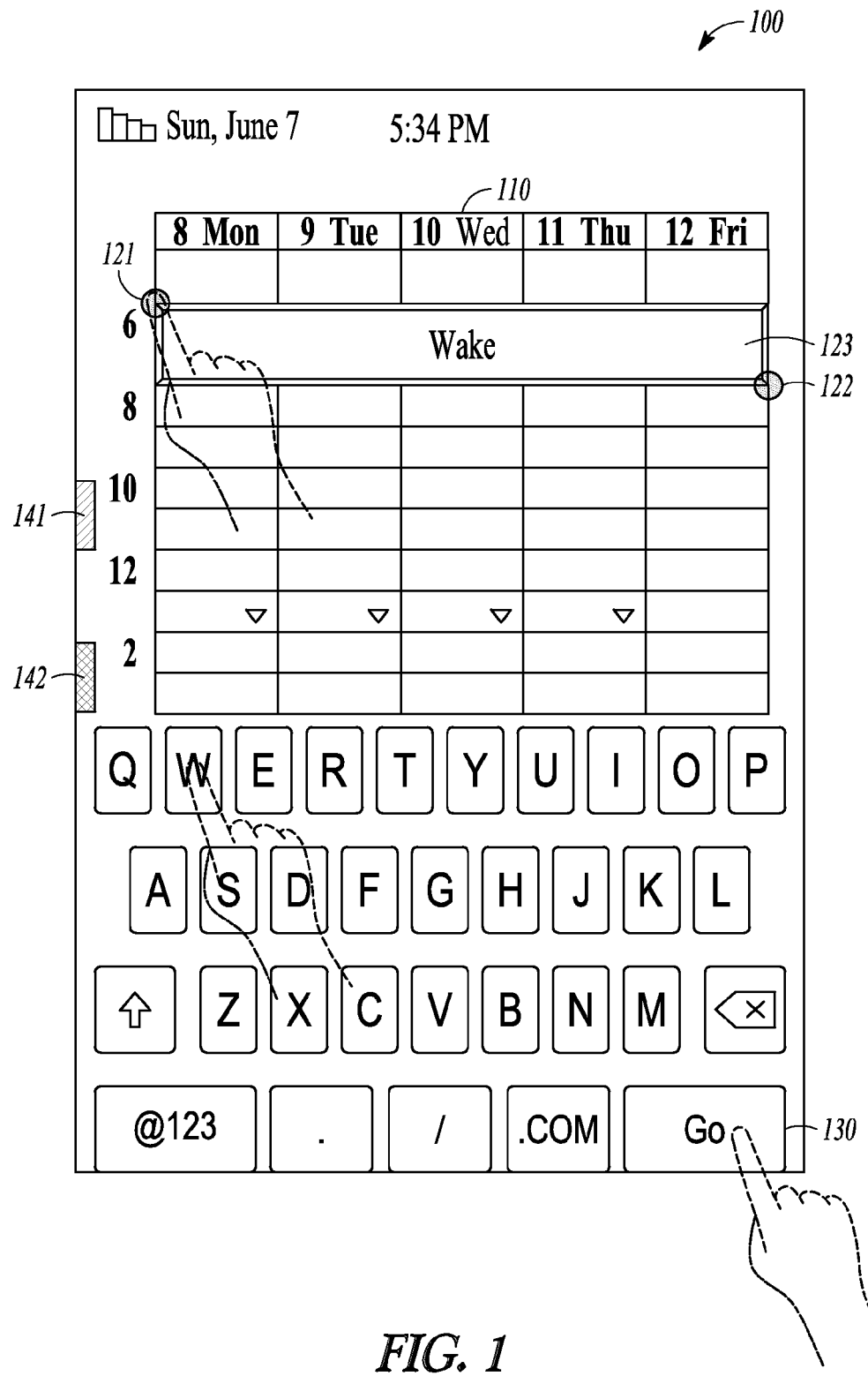
FIG. 1 depicts an example embodiment of a calendar entry scheduling interface operating on an example energy management device.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human or enterprise-implemented procedures in one embodiment. The software may consist of computer-executable instructions stored on computer-readable media such as memory or other type of storage devices. Further, such functions may correspond to modules, which are software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The present disclosure describes a series of techniques and interface configurations that enable the creation and modification of energy management schedules using gesture interaction within touch screen interfaces. Providing a series of intuitive interfaces within an energy management device enables even unskilled or untrained users to establish and change system times of operation, and conserve energy with system operations. In contrast to existing thermostat controls that use a touch capacitive display to only receive input for a series of buttons, the use of touch screen gestures in the presently described device enables a user to easily and comprehensively manipulate an interface with finger actions such as pinch, expand, tap, hold, drag and drop, flick, and the like.

In particular, the techniques and interface configurations enable creation of energy management schedules applicable to the operation and control of a variety of systems and equipment in residential or commercial settings. As one specific example, a thermostat device presenting a touch screen to a user may accept user interactions and process certain sets of touch screen gestures and touch commands to create and modify schedules for the operation of HVAC (heating, ventilation, air conditioning) equipment and systems.

The present user interface techniques and configurations, further, may provide a variety of ways to visualize information and intuitively interact with a touch-screen display user to create and modify schedule programs. The energy management device programs therefore can extend to any of a variety of industrial, commercial, or consumer appliances and energy-using systems.

The described techniques for schedule creation and manipulation may be implemented in a variety of fashions. In one embodiment, a specific scheduling user interface configuration enables intuitive schedule programming uses on small screen devices (either mounted or portable) that have space or display size constraints. The schedule interface may be provided within the device in a variety of fashions, including a calendar grid, a linear daily schedule, or a modifiable clock. For example, in connection with the display of a calendar grid, a calendar visualization interface may be provided on a touch screen capable of receiving and processing multipoint touch gestures, such as a liquid crystal display, an organic liquid crystal display, and other types of capacitive touch screen displays.

Figure 2:
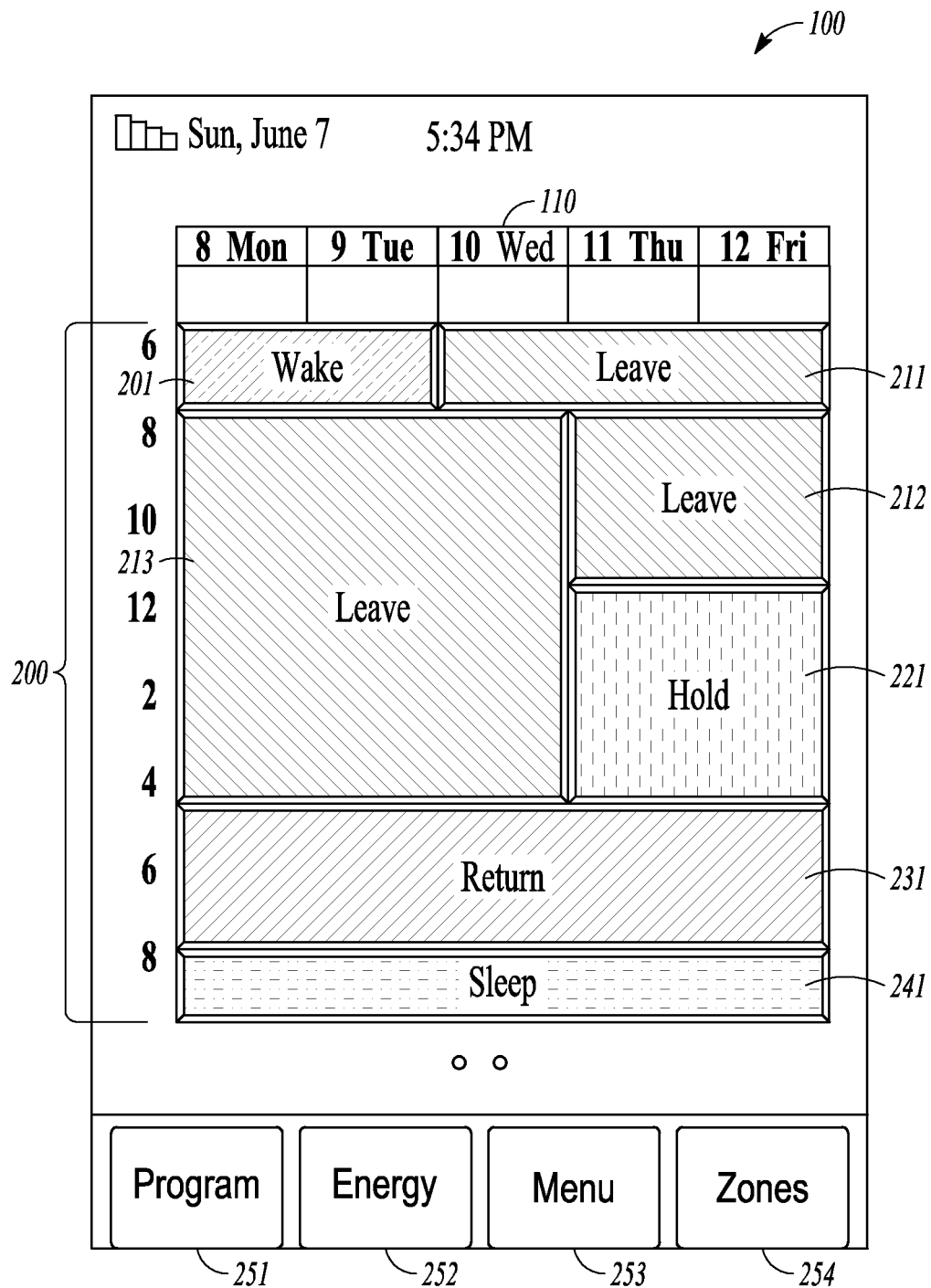
FIG. 2 depicts an example embodiment of a calendar listing scheduling interface operating on an example energy management device.

In the scheduling embodiment illustrated in FIGS. 1-2, an energy management calendar 110 may be represented in a grid structure on a device touch screen 100 with columns representing the days, and rows representing times at a predefined interval resolution, such as 2-hour intervals. (This may also be presented by default in a higher or lower number of hours or minutes, or provide an entire-day view if screen space permits).

Pinch and expand gestures may be performed on the touch screen 100 by a user to increase the resolution of the time interval. A swipe to right gesture (i.e., a finger swipe to from left to right on the touch screen 100) may be used to scroll to view more calendar days to the right (such as to show weekend days), and a swipe to left gesture (i.e., a finger swipe from the right to left on the touch screen 100) may be used to go back to the previous view.

The user may establish a starting point for a time period such as point 121 (Monday, at 6 AM) by touching this time on the touch screen 100. After establishing a starting point, the user can then select an ending point such as point 122 (Friday, at 8 AM), establishing a selected time period 123 across the energy management calendar 110 of Monday-Friday, 6 AM-8 AM. Upon establishing a selected calendar entry 123 across the energy management calendar 110, an on-screen keyboard 130 or similar interface may appear to allow the user to write a custom label or user-inputted description (such as "Wake"). Alternately, the user interface may provide pre-labeled descriptions such as "Wake", "Leave", "Return", and prompt the user to set time periods for these pre-defined labels. The user may remain on the calendar screen to establish multiple periods of time, drag the period of time across the energy management calendar 110, and resize the periods of time within the calendar as appropriate (for example, to move the "Wake" period to 10 AM on Fridays). The calendar days selected and modified within the selected calendar entry 123 may correspond to specific days (e.g., June 8-12) or all days generally (e.g., every Monday-Friday year round).

Further, within the displayed schedule on the touch screen 100, the user may be provided with a visualization of the time-of-use of the electricity or other energy resource prices. In FIG. 1, this is depicted with the indicators 141 and 142, which may be set to certain colors or other legends. For example, peak electric demand may establish a higher rate of air conditioning scheduling during afternoon hours. Providing an indication of the time-of-use pricing directly within the energy management calendar 110 visualization enables the user to directly schedule the thermostat with energy conservation and price savings in mind.

FIG. 2 provides an illustration of energy management calendar 110 with a series of time periods 200 established within the energy management calendar 110. Specifically, in the energy management calendar 110, a "Wake" time period 201 has been established between 6-8 AM on Monday and Tuesday; "Leave" time periods 211, 212, 213 have been established between 6-8 AM on Wednesday, Thursday and Friday, 8 AM-12 PM on Thursday and Friday, and 8 AM-5 PM on Monday, Tuesday and Wednesday; "Return" time period 231 has been established between 5 PM-9 PM on Monday, Tuesday, Wednesday, Thursday and Friday; and a "Sleep" time period 241 has been established between 9-10 PM on Monday, Tuesday, Wednesday, Thursday and Friday. A "Hold" time period 221 between 12 PM-5 PM on Thursday and Friday indicates a schedule override period, such as where the user directly intervenes to put a schedule on hold. As further shown in FIG. 2, the display of the energy management calendar 110 within touch screen 100 may be accompanied by other user interface navigation buttons such as buttons 251, 252, 253, 254.

As suggested above, the energy management device may be configured to receive and process a variety of interactive actions and gestures for establishing or changing scheduling. Further, specific sets of touch gestures may be associated with programming schedule user interface commands. For example, the energy management device may be configured to enable a user to touch and hold a finger anywhere on the grid to select the x and y coordinates of the grid that corresponds to the day and time respectively. Sliding a finger along the grid to another point may select and highlight all the area bounded by the x, y coordinates of the starting and ending points. Upon lifting the finger from the touch-screen device, a keypad may pop-up to enable typing in the label of the schedule period highlighted. Alternatively, previously defined schedule periods may be available for selection such as with a radio selection or a drop-down box.

Once a schedule period is created within the energy management calendar 110, the schedule period is displayed as a rectangular box (button) highlighted along with its label. Using a touch and hold gesture in the corners of the rectangular button allows the schedule period to be dragged to resize the area of the rectangle, and thereby increase or decrease the size of the rectangle which corresponds to the time period. Therefore, changes in the time periods can be done by simple one-touch drag or swipe gestures without having to go through an elaborate editing process or manual configuration. Likewise, schedule periods may be color-coded, accompanied by icons, or configured to provide other non-textual indications of usage.

Figure 3:
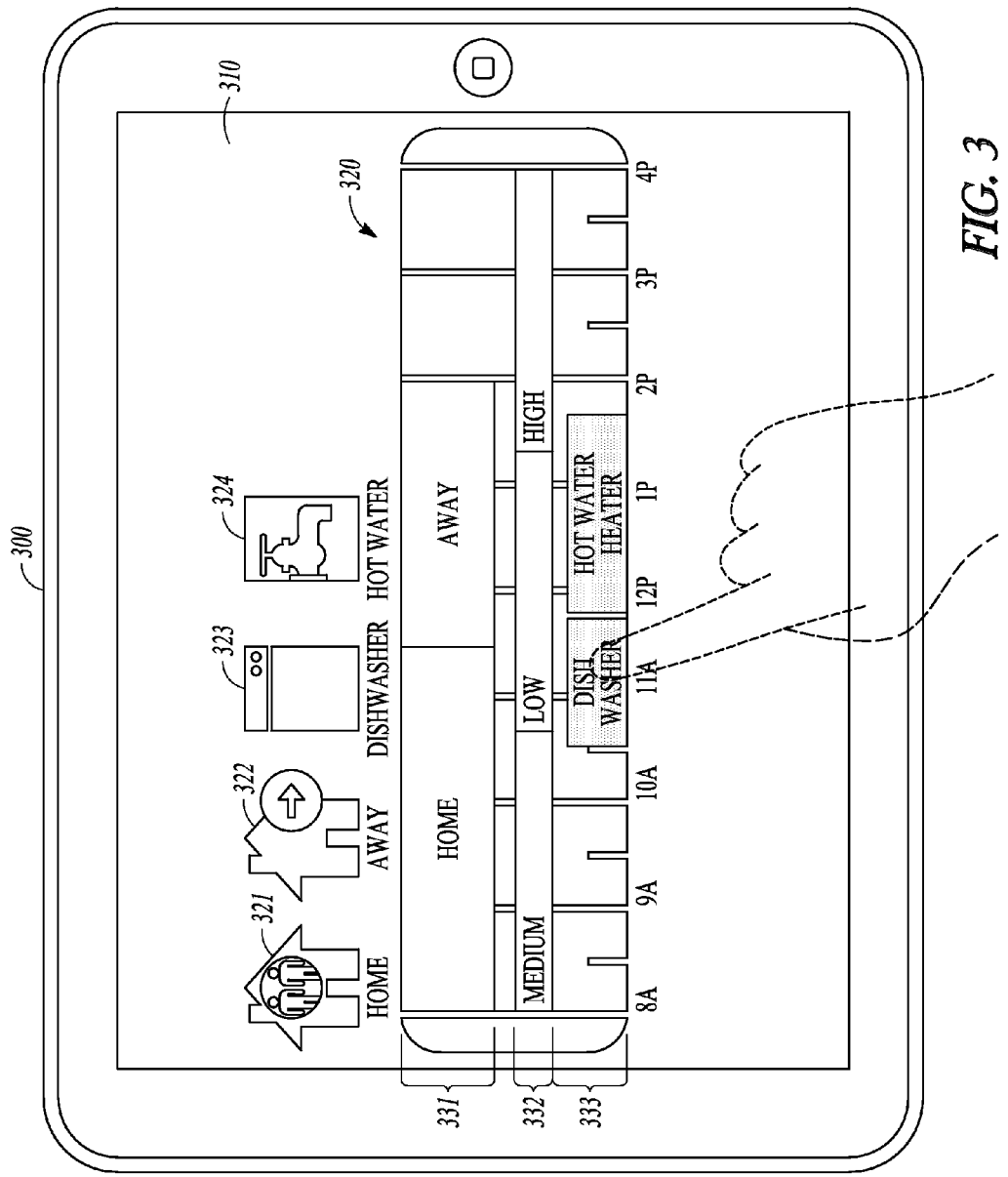
FIG. 3 depicts an example embodiment of an appliance and energy system scheduling interface operating on an example energy management device.

A further scheduling technique provides for scheduling appliances or other specific controllable energy-consuming systems through use of an energy management device. FIG. 3 provides an illustration of a scheduling interface 310 displayed within a touch screen of an energy management device 300 such as a portable tablet. In the particular embodiment illustrated in FIG. 3, a daily schedule 320 may be depicted within the energy management device 300 screen to provide feedback on when particular appliances or systems have been scheduled. This enables a user to both establish schedules for appliances and systems, and view the appliances and system that have been scheduled throughout a particular day.

As illustrated in FIG. 3, the baseline for the schedule 320 may be dependent on concepts such as whether the user is at home, away, or asleep during the schedule (depicted in schedule section 331), and whether peak or non-peak pricing is in effect for particular appliances or systems during the schedule (depicted in schedule section 332). For example, tiers of energy pricing may take effect throughout the day, such as medium pricing between 8 AM-10:45 AM; low pricing between 10:45 AM-1:20 PM; and high pricing between 1:20 PM and 4:00 PM.

The scheduling technique illustrated in FIG. 3 enables appliance and system needs to be reconciled within the schedule 320 and considers the location of the user. This is depicted in the appliance placement on schedule section 333. Thus, certain appliances such as a dishwasher might be optimally run when home occupants are away; whereas a hot water heater may be off while occupants are away but need to restart within a certain number of minutes of the home occupants returning.

The location of the user on the schedule 320 (whether the user is home or away) may be automatically determined or pre-populated based on the import of a family calendar, based on a mobile device location (e.g., if a mobile phone with location tracking is proximate to the user's home), or based on security system activation and settings. The user may also customize a manual home/away schedule within the scheduling interface 310 or provide exceptions to general scheduling rules.

For example, to control a series of appliances (such as an electric hot water heater, dishwasher, and the like), the appliances may be represented as appliance icons 323, 324 on the display next to the schedule section 332 indicating the electricity pricing relative to the time-of-use. The appliance icons 323, 324 may be individually selected by a simple touch gesture. Each appliance icon 323, 324 can then be dragged and dropped to the time when the user wants to schedule it. The user can use natural drag and drop single-touch gestures to indicate occupancy status and desired appliance operation times. The energy management device 300 may allocate a set amount of time in the schedule 320 for each appliance based on appliance type or other known considerations.

As shown in FIG. 3, the scheduling interface 310 visualizations enable time of use pricing and activities to be compared to a user's actual home and away schedule. The energy management device 300 or a larger energy management system may process the user input to propose a more optimal or money-saving schedule. Most importantly however, it enables a user to easily move icons or status bars to change settings, and create easy settings of Home vs. Away or other occupancy statuses relative to a plurality of appliances and systems. Moreover, this scheduling technique is capable of providing clear indications and feedback on when particular appliances have been scheduled. This scheduling interface 310 therefore may be used to both schedule the appliances as well as easily indicate when appliances and systems have been scheduled.

A further scheduling technique deployable in the energy management device provides a clock representation to users to enable advanced scheduling. This clock representation is provided within a touch screen display in energy management device 400, illustrated in a summary and detailed form in FIGS. 4 and 5 respectively.

Use of a clock metaphor is intuitive to many users and provides the ability to see the direct use of device energy over longer periods of time. Further, clocks are easy to use to schedule larger blocks of time, and provide the ability to easily indicate peak vs. off-peak or other tiered usage. Clocks can represent custom periods, but most typically are displayed in 12-hour or 24-hour periods.

Providing a clock within a touch-screen interface may be particularly helpful for establishing appliance and HVAC system scheduling. A clock enables simple system operations such as temperature control and appliance run-times to be implemented only during certain hours. Further, use of a clock enables multiple device schedules to be compared with utility schedules and peak/off-peak rates, and immediate feedback to be provided to the user based on the custom schedules.

Figure 4:
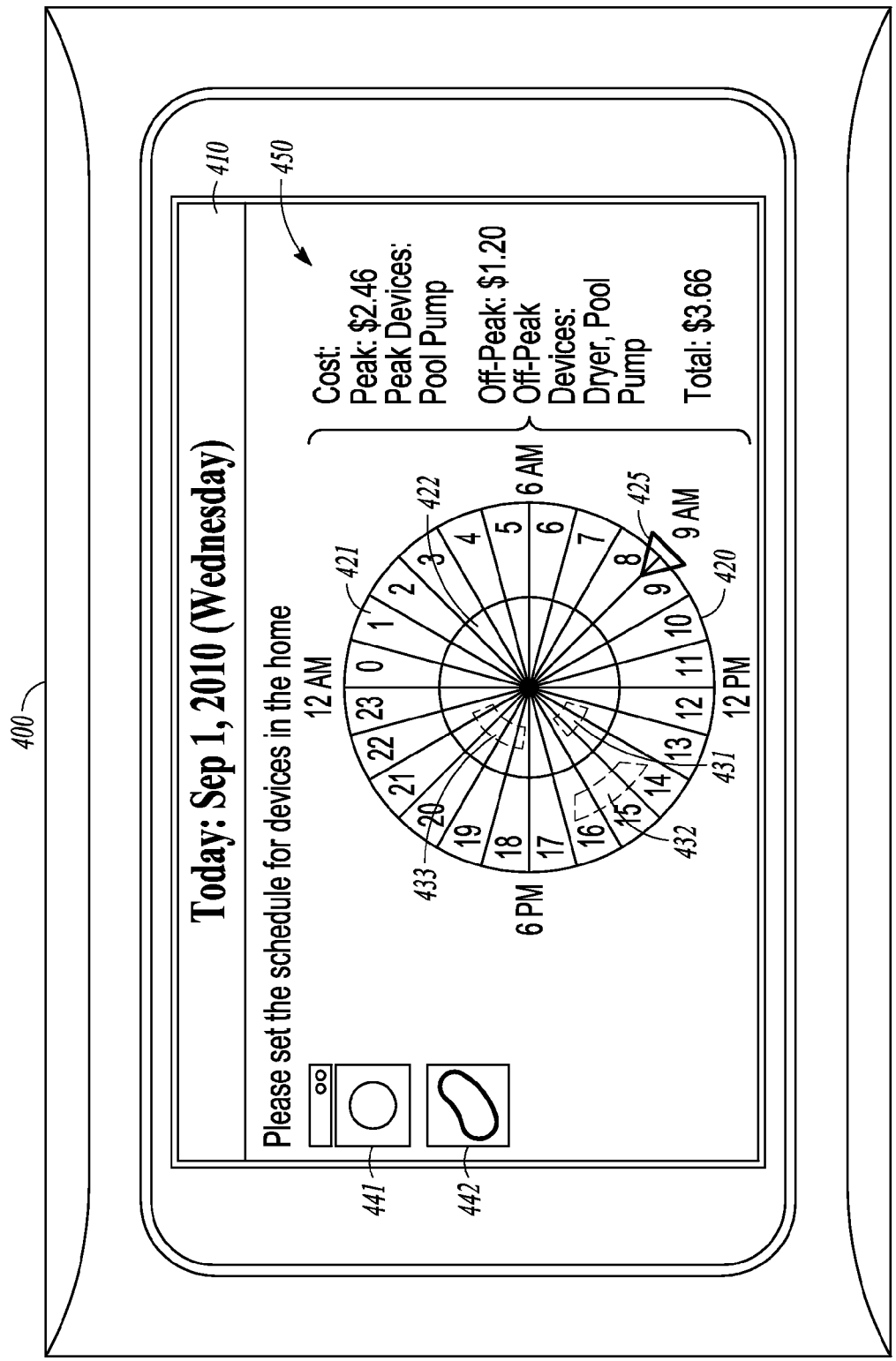
FIG. 4 depicts an example embodiment of a summarized clock scheduling interface operating on an example energy management device.
Figure 5:
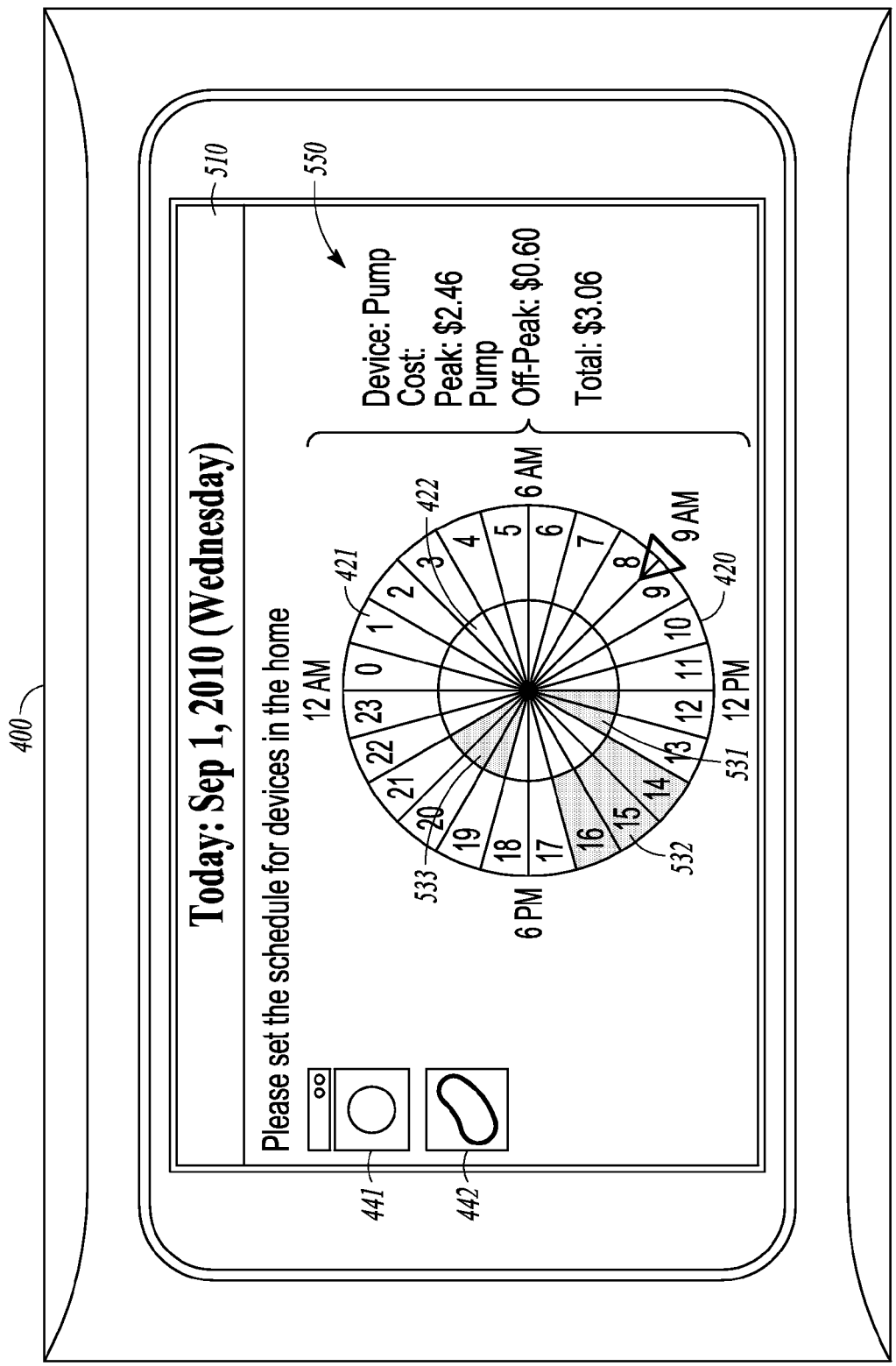
FIG. 5 depicts an example embodiment of a detailed clock scheduling interface operating on an example energy management device.

In one embodiment, the clock representation may be presented in two levels, with a first level providing an overview display showing all device schedules (illustrated in FIG. 4) and a more detailed display based on a selected scheduled device (illustrated in FIG. 5). The clock representation may alternatively be presented in a single display.

As shown in the example energy management device 400 of FIG. 4, to schedule operation of an appliance or other device or system, a user can simply drag and drop an icon (such as dryer icon 441 or swimming pool icon 442) representing an appliance or energy-consuming system onto the appropriate start time within clock 420. A current time indicator 425 is also presented against the clock 420 to represent the current time. Users can also add new device icons from the device library or provide customized icons. The time of operation for the selected device can then be automatically provided for normal operation or stretched across the clock 420 as desired by the user.

The overview display view 410 in FIG. 4 provides information on the run time duration and cost for each appliance or device in the energy management system based on schedule and price tiers. As illustrated in this specific example, an inner tier 422 of the clock 420 indicates runtime for non-peak usage; whereas the outer tier 421 of the clock 420 indicates runtime for peak usage. When an icon for a device or appliance is placed on clock 420, the run time will span the appropriate space on the clock 420, and between peak and off-peak rates (such as shown in the runtime example of the swimming pool icon 442 operating in clock periods 431 and 432 with non-peak and peak times respectively).

The detailed display view 510 in FIG. 5 also provides the ability to place runtime(s) for a specific appliance or device against the inner tier 422 of the clock 420 and the outer tier 421 of the clock 420 for non-peak and peak usage respectively. The detailed display view 510 may be used to reschedule the specific device or appliance with a larger close-up view, as shown with runtimes 531 and 532.

The clock 420 provided on the overview display view 410 and detailed display view 510 may be modified with any number of intuitive touch screen gestures. For example, referring to FIG. 4, if the user wants to change the schedule on the overview display view 410, he or she can simply select and slide the slider segments on the clock dial (such as 431, 432, 433) representing the appropriate appliance or device using a finger gesture. When the user moves the slider segment to another position, the duration and cost are automatically calculated, adjusted, and displayed on the slider within the clock dial.

Selecting a device on the slider without movement of the device in the schedule may be configured to bring up the detailed display view 510 that can also be used to modify default schedules and other preferences for the specific device in the home or building setting. This action may also be available when the user selects a device icon.

Both the overview display view 410 and detailed display view 510 may be made available for all known devices even if they are not scheduled yet. Other relevant information to the energy management system may be provided on either or both of the overview display view 410 and detailed display view 510. For example, total energy usage cost may be displayed on the overview display view 410 for all devices as illustrated in section 450 of FIG. 4. The specific cost for the device may be displayed on the detailed display view 510 as shown in section 550 of FIG. 5 (in this specific illustration, specific prices attributable to the pool pump).

Use of a touch-screen clock 420 enables a user to instantly obtain feedback relevant to usage levels in comparison to displayed peak and off-peak pricing tiers and times. Further, it enables a user to change usage levels to schedule appliances accordingly. Many of the touch-screen commands and gestures previously described (such as movement, pinching/ zooming, scrolling, and the like) may be used to manipulate and interface with the depiction of the clock 420.

The previously described techniques deployed in a touch-screen interface provide significant improvements over scheduling interfaces provided by existing energy management devices. Users are not required to utilize an elaborated wizard-based approach to create or modify programming schedules. Furthermore, the interaction can be performed by an unskilled user with little or no training. Other existing systems provide a cumbersome multiple step approach to create or modify schedule periods and generally do not provide a modifiable graphical visualization such as a calendar or daily clock that enables a user to view and understand the overall schedule summary.

Additionally, the previously described techniques provide a visualization of the schedule summary once created in one screen. This schedule may be graphical in nature, which may be far easier to comprehend than text-based tabular information. Further, the various visualizations and interaction techniques described herein are suitable for displays provided in both portable and mounted devices, with small and large screens.

In particular, an energy management device may be configured to present the previously described techniques individually or in combination. For example, an energy management device may be configured to allow user selection and switching between specific views of energy control (such as between the daily grid calendar in FIGS. 1-2, and the daily clock calendar illustrated in FIGS. 4-5). In either view, gestures may be used to enable a user to intuitively identify, create, and modify an area or point of interest on the schedule. Likewise, a combination of the views may be used to enable a user to zoom into a schedule period to see more level of detail (such as hour-by-hour with a calendar grid), or to zoom out to get an overall schedule summary of a single day (such as with the daily calendar).

An example energy monitoring and control system configured to implement the previously described techniques may include a plurality of components. In one particular embodiment, the system may include a series of energy controls configured to interface with appliances or energy-consuming systems, an energy management device with a touch screen, and instructions or other logic operating on the energy management device used to display a user interface within the touch screen and accept and process the user gestures and commands from touch screen inputs.

In accordance with the techniques described above, the energy management device may also be configured for integration with a variety of types of energy related systems, including HVAC and IAQ (Indoor Air Quality) systems, gas consuming appliances and systems, and electricity consuming appliances and systems. Further, the energy management device may be configured for integration with a smart home control system and home automation systems.

The deployment of the various algorithms and user interfaces to process the touch gestures and selections can be used in a variety of ways. As previously described, this may be deployed within a standalone energy management device (such as a thermostat) or in a larger energy management system. Likewise, it may be performed in connection with a thin-client energy management device such as a remote control tablet which receives instructions and relies on processing from a remote system.

Although a number of examples were described herein relating to energy management devices such as thermostats, those skilled in the art would recognize that the techniques may be applied to mobile as well as wall-mounted or other permanent/fixed energy management devices. Further, the techniques described herein may be deployed in standalone, integrated, or embedded energy management software operating on various types of electronic and computing systems, such as mobile phones, tablets, personal computers, and other electronic computing devices which accept user input and provide the ability to interact with an energy control system. Further, the various techniques may be established or otherwise interfaced through use of a variety of internet-connected applications, thereby enabling user creation and manipulation of energy management schedules to and from remote locations.

Figure 6:
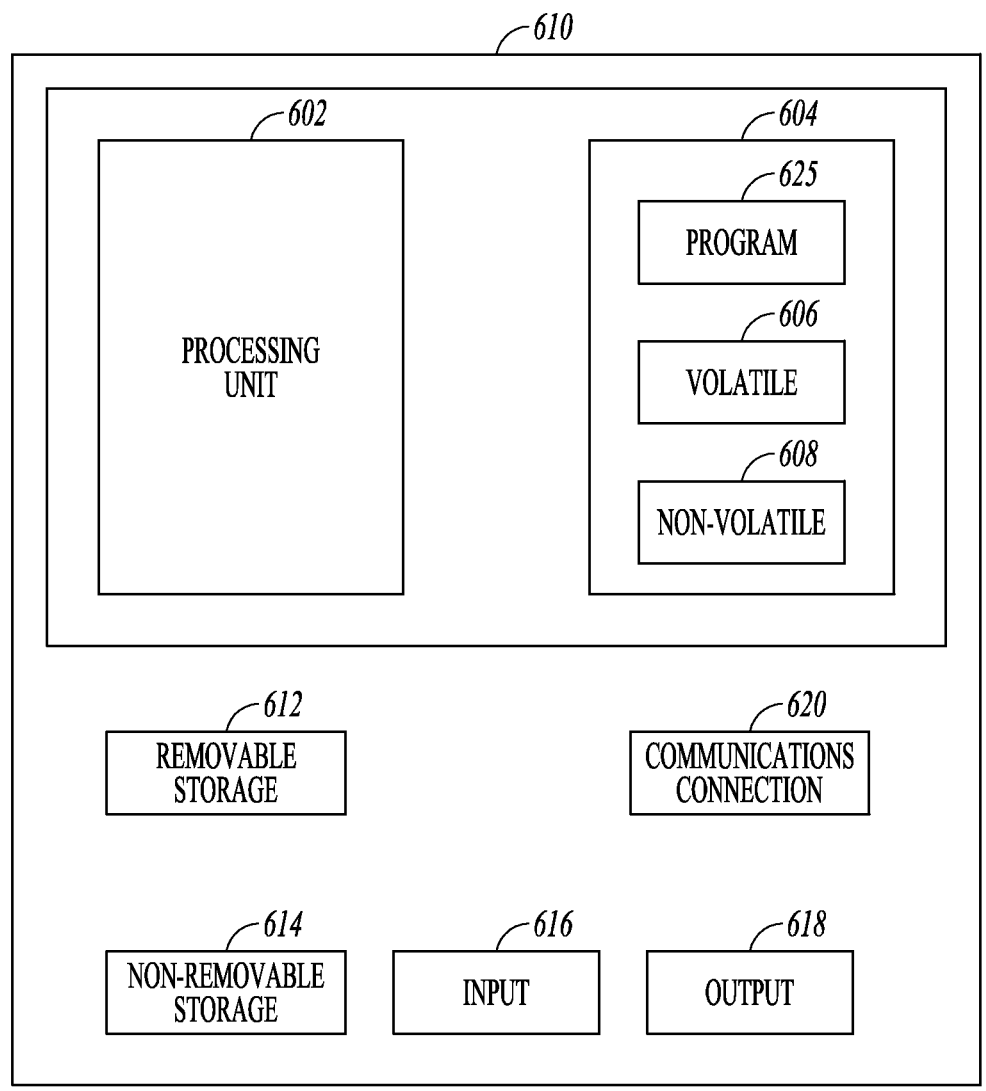
FIG. 6 depicts a block diagram of an example computer system enabled to present a user interface and execute other programming in conjunction with various user interface techniques of an energy management device.

A block diagram of a general computing device that may be configured to present a user interface and execute other programming in conjunction with the user interface techniques described above is shown in FIG. 6. A general computing device in the form of a computer 610 may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communications connection 620. The computer 610 may operate in a networked environment using a communication connection to connect to one or more remote computers. A remote computer may include a personal computer (PC), server, router, network PC, a peer device or other common network node, or the like. The communications connection 620 may include a Local Area Network (LAN), a Wide Area Network (WAN) or other networks.

Computer-readable instructions to execute methods and algorithms described above may be stored on a computer-readable medium such as illustrated at a program storage device 625 are executable by the processing unit 602 of the computer 610. A hard drive, CD-ROM, and RAM are some examples of articles including a computer-readable medium. In one embodiment, a user interface is provided, such as a touch screen device for providing both input 616 and output 618. Those skilled in the art would recognize the type of hardware, communications, and computer architecture changes that would be needed to provide user interfaces on a portable computing device, particularly for use in energy management settings in accordance with the embodiments described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An energy management device, comprising:
a touch screen display; and
a processor executing programming logic for interfacing with the touch screen display, the programming logic configured to:
generate a visualization of a programming schedule on the touch screen display, the programming schedule specifying times for operation of an energy-consuming system;
track a first continuous contact received on the touch screen display, wherein the first continuous contact occurs along a first path of touch points of the touch screen display starting at a first point of the touch screen display and ending at a second point of the touch screen display;
process data representing the first continuous contact to determine performance of a selection gesture on the touch screen display, the selection gesture to select a period of interest for the energy-consuming system within the visualization of the programming schedule, wherein the first point and the second point are correlated to the period of interest for the energy-consuming system, wherein the first point and the second point are located within or in proximity to a representation of the period of interest in the visualization of the programming schedule on the touch screen display;
track a second continuous contact received on the touch screen display, wherein the second continuous contact occurs along a second path of touch points of the touch screen display starting at a third point of the touch screen display and ending at a fourth point of the touch screen display;
process data representing the second continuous contact to determine performance of a modification gesture on the touch screen display, the modification gesture to modify the selected period of interest for the energy-consuming system within the visualization of the programming schedule from a first period of time to a second period of time, wherein the third point and the fourth point are correlated to the selected period of interest for the energy-consuming system, wherein the third point and the fourth point are located within or in proximity to the representation of the selected period of interest in the visualization of the programming schedule on the touch screen display;
generate an updated visualization of the programming schedule on the touch screen display in response to the modification gesture, the updated visualization of the programming schedule displaying the second period of time for the selected period of interest; and
implement the modification to the selected period of interest in the programming schedule for operation of the energy-consuming system, wherein the times of the programming schedule for operation of the energy-consuming system are adapted to the second period of time.

2. The energy management device of claim 1, wherein the visualization of the programming schedule includes a calendar providing visual indications of peak energy usage periods and peak usage rates, for multiple periods of interest within a time period specified for the calendar.

3. The energy management device of claim 2, wherein the programming logic is further configured to establish, for the selected period of interest in response to the modification gesture, a new starting point in time and a new ending point in time for the selected period of interest.

4. The energy management device of claim 1, wherein the visualization of the programming schedule includes a calendar view, wherein the calendar view displays indications for: one or more energy pricing tiers, runtime of each energy-consuming system, and occupancy status, within the calendar view.

5. The energy management device of claim 4, wherein the calendar view displays a portion of a day, wherein the energy pricing tiers include at least two energy pricing tiers, and wherein the occupancy status includes a home status and an away status.

6. The energy management device of claim 1, wherein the visualization of the programming schedule includes a clock presenting visual indications of peak and non-peak energy usage periods, and segments representing specific devices or appliances spanning periods of time overlaid on the clock.

7. The energy management device of claim 1, wherein the energy management device is a thermostat.

8. The energy management device of claim 1, wherein the energy management device is a self-powered portable device.

9. The energy management device of claim 1, wherein the energy management device is a mobile computing device including processor-executable instructions configured to perform energy management operations of the programming logic, the mobile computing device configured for operation as a mobile telephone, a tablet computer, a netbook computer, or a notebook computer.

10. The energy management device of claim 9, wherein the energy-consuming system is one or more of a heating ventilating air conditioning (HVAC) system, an electric appliance, or a gas appliance.

11. The energy management device of claim 1, the programming logic further configured to:
generate an intermediate visualization of the programming schedule on the touch screen display, in response to the selection gesture and prior to the modification gesture, the intermediate visualization of the programming schedule displaying a selection of the first period of time for the selected period of interest.

12. An energy control system comprising:
a plurality of energy controls; and
an energy management device operably in communication with the plurality of energy controls and configured to provide commands to the plurality of energy controls according to a programming schedule established with the energy management device, the programming schedule specifying times of operation for respective energy-consuming systems operably coupled to the plurality of energy controls, the energy management device comprising:
a touch screen display; and
a processor executing programming logic for interfacing with the touch screen display, the programming logic configured to:
generate a visualization of the programming schedule on the touch screen display;
track a first continuous contact received on the touch screen display, wherein the first continuous contact occurs along a first path of touch points of the touch screen display starting at a first point of the touch screen display and ending at a second point of the touch screen display;
process data representing the first continuous contact to determine performance of a selection gesture on the touch screen display, the selection gesture to select a period of interest for a particular energy-consuming system within the visualization of the programming schedule, wherein the first point and the second point are correlated to the period of interest for the particular energy-consuming system, wherein the first point and the second point are located within or in proximity to a representation of the period of interest in the visualization of the programming schedule on the touch screen display;

track a second continuous contact received on the touch screen display, wherein the second continuous contact occurs along a second path of touch points of the touch screen display starting at a third point of the touch screen display and ending at a fourth point of the touch screen display;

process data representing the second continuous contact to determine performance of a modification gesture on the touch screen display, the modification gesture to modify the selected period of interest for the particular energy-consuming system within the visualization of the programming schedule from a first period of time to a second period of time, wherein the third point and the fourth point are correlated to the selected period of interest for the particular energy-consuming system, wherein the third point and the fourth point are located within or in proximity to the representation of the selected period of interest in the visualization of the programming schedule on the touch screen display;

generate an updated visualization of the programming schedule on the touch screen display, in response to the modification gesture, the updated visualization of the programming schedule displaying the second period of time for the selected period of interest; and implement the modification to the selected period of interest in the programming schedule for operation of the particular energy-consuming system, wherein the times of the programming schedule for operation of the particular energy-consuming system are adapted to the second period of time.

13. The energy control system of claim 10, wherein the plurality of energy controls interact with the respective energy-consuming systems to implement control of the respective energy-consuming systems based on the programming schedule.

14. The energy control system of claim 10, wherein the respective energy-consuming systems include one or more of a heating ventilating air conditioning (HVAC) system, an electric appliance, or a gas appliance.

15. A method for defining schedules performed by an energy management device, comprising:

generating a visualization of a programming schedule on an energy management interface of the energy management device, the energy management device including a touch screen display to provide output and receive input for the energy management interface, and the programming schedule specifying times for operation of an energy-consuming system;

tracking a first continuous contact received on the touch screen display, wherein the first continuous contact occurs along a first path of touch points of the touch screen display starting at a first point of the touch screen display and ending at a second point of the touch screen display;

processing data representing the first continuous contact to determine performance of a selection gesture on the touch screen display, the selection gesture to select a period of interest for the energy-consuming system within the visualization of the programming schedule, wherein the first point and the second point are correlated to the period of interest for the energy-consuming system, wherein the first point and the second point are located within or in proximity to a representation of the period of interest in the visualization of the programming schedule on the touch screen display;

tracking a second continuous contact received on the touch screen display, wherein the second continuous contact occurs along a second path of touch points of the touch screen display starting at a third point of the touch screen display and ending at a fourth point of the touch screen display;

processing data representing the second continuous contact to determine performance of a modification gesture on the touch screen display, the modification gesture to modify the selected period of interest for the energy-consuming system within the visualization of the programming schedule from a first period of time to a second period of time, wherein the third point and the fourth point are correlated to the selected period of interest for the energy-consuming system, wherein the third point and the fourth point are located within or in proximity to the representation of the selected period of interest in the visualization of the programming schedule on the touch screen display;

generating an updated visualization of the programming schedule on the touch screen display, in response to the modification gesture, the updated visualization of the programming schedule displaying the second period of time for the selected period of interest; and implementing the modification to the selected period of interest in the programming schedule for operation of the energy-consuming system, wherein the times of the programming schedule for operation of the energy-consuming system are adapted to the second period of time.

16. The method of claim 15, wherein generating the visualization of the programming schedule includes generating a visualization of a calendar providing visual indications of peak energy usage periods, peak usage rates, and scheduling for multiple periods of interest within a time period of the calendar.

17. The method of claim 16, further comprising: establishing, for each period of interest scheduled within the calendar, a starting point in time, an ending point in time, and a description, in response to the modification gesture received within the energy management interface.

18. The method of claim 15, wherein generating the visualization of the programming schedule on the energy management interface includes generating a visualization of a single calendar view of one or more energy pricing tiers, runtime of the energy-consuming system, and occupancy status.

19. The method of claim 18, wherein the single calendar view depicts a portion of a day, wherein the energy pricing tiers include at least two energy pricing tiers, and wherein the occupancy status includes a home status and an away status.

20. The method of claim 15, wherein generating the visualization of the programming schedule on the energy management interface includes generating a visualization of a clock with visual indications of peak and non-peak energy usage periods, and segments representing specific devices or appliances spanning periods of time overlaid on the clock.

21. The method of claim 15, wherein the energy management device is a thermostat.

* * * * *